(12) United States Patent
Janninck et al.

(10) Patent No.: US 6,768,899 B2
(45) Date of Patent: Jul. 27, 2004

(54) ROTATIONAL MECHANISM FOR A WIRELESS COMMUNICATION DEVICE

(75) Inventors: Mark Daniel Janninck, Glen Ellyn, IL (US); Mark William Oliver, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 417 days.

(21) Appl. No.: 09/826,180

(22) Filed: Apr. 4, 2001

(65) Prior Publication Data

US 2003/0017810 A1 Jan. 23, 2003

(51) Int. Cl.[7] .............................. H04B 1/38; H04M 1/00
(52) U.S. Cl. ........................ 455/90; 455/566; 455/575
(58) Field of Search .......................... 455/90, 566, 575, 455/550; 379/433.13, 434

(56) References Cited

U.S. PATENT DOCUMENTS

| | | | |
|---|---|---|---|
| 4,484,029 A | 11/1984 | Kenney | |
| 5,485,517 A | 1/1996 | Gray | |
| 5,504,812 A | 4/1996 | Vangarde | |
| 6,016,347 A | 1/2000 | Magnasco et al. | |
| 6,230,028 B1 * | 5/2001 | Shirakawa | .................. 455/566 |

FOREIGN PATENT DOCUMENTS

| | | | |
|---|---|---|---|
| DE | 3323858 A1 * | 1/1985 | .................. 455/90 |
| GB | 2315709 | 2/1998 | |
| JP | 60-21636 | 4/1985 | |

* cited by examiner

Primary Examiner—Nay Maung
Assistant Examiner—Raymond Persino
(74) Attorney, Agent, or Firm—Hisashi D. Watanabe; Shigeharu Furukawa

(57) ABSTRACT

This invention is a wireless communication device (100) including a first housing (220) with a housing support (250) and a second housing (120) positioned about the housing support, or a portion thereof, so that the second housing may rotate around the housing support. Also, the second housing (120) includes a circular portion (122) positioned about the housing support (250) and an extending portion (124) extending from the circular portion. When the device (100) is in a closed position (110), the circular and extending portions (122 & 124) of the second housing (120) are adjacent to the first housing (220). When the device (100) is in an opened position (210), the circular portion (122) is adjacent to the first housing (220) and the extending portion (124) is away from the first housing. In addition, the second housing (120) may have multiple position relative to the first housing (220) in which each position activates a particular function of the device (100).

25 Claims, 5 Drawing Sheets

ROTATIONAL MECHANISM FOR A WIRELESS COMMUNICATION DEVICE

FIELD OF THE INVENTION

The present invention relates generally to the field of portable electronic devices and, more particularly, to a wireless communication devices having a unique form factor to facilitate its portability and maximize its functionality.

BACKGROUND OF THE INVENTION

Portable electronic devices have many functions and come in a variety of different form factors. To increase their appeal, manufacturers of such devices focus on minimizing their form factor and while maximizing their functions. The flip-type device has a collapsible form factor that is particularly popular among manufacturers of wireless communication devices, such as radiotelephones, paging devices, personal digital assistant and the combination of these devices. The flip-type device includes two sections connected by a hinge that flip open for general operation of the device and flip closed for convenient transport of the device. Many wireless communication devices having the collapsible form factor provide a display an inner surface of the device so that it is exposed when the device is open and hidden when the device is closed.

Several wireless communication devices provide a viewable display when the devices are closed. As a result, a user may receive useful information, such as caller ID and time/date information, provided on the viewable display while the device is closed. One common type of wireless communication device provides a second display on the outer surface of the device. Another known type of wireless communication device provides an opening through one of the sections of the flip phone so that display on the inner surface of the device is exposed through the opening when the device is closed. Specifically, a first section of the device includes a display, and a second section of the device has two arms that attach to the first section with a large opening therebetween. Unfortunately, the arms of the open section tend to be unstable and fragile since the large opening between the two arms do not provide much support. Also, for both types of devices, the display is not conveniently viewable by the user when the device is transitioning from the closed position to the opened position and vice-versa.

Another type of wireless communication device with a collapsible form factor has two sections with inner surfaces that slide past each other to rotate open and slide together to rotate closed. For this configuration, the display is located on an outer surface of one section and is viewable by the user in both the opened and closed positions of the device. Unfortunately, if the display is considered to be right side up when the device is opened, the display is upside down when the device is closed due to the rotation of its corresponding section. Therefore, existing rotatable phones do not have conveniently viewable displays for both opened and closed positions.

There is a need for a wireless communication device with a collapsible form factor having a conveniently viewable display when the device is opened as well as closed. Also, the display should be conveniently viewable while the device is transitioning between the opened and closed positions. In addition, the desired device should not compromise the stability and rigidity of the device in the opened and closed positions. The functionality of the desired device should be maximized, and it is further desirable to have a viewable display configuration that provides increased functionality to the device.

DETAILED DESCRIPTION OF THE PREFERRED EMBODIMENT(S)

The present invention is a wireless communication device including first and second housings. The first housing includes a housing support capable of retaining a display. The second housing includes a circular portion positioned about a portion of the housing support, namely the support rim, and an extending portion extending away from the circular portion. The second housing, particularly the circular portion, is capable of rotating around the portion of the support rim of the housing support. The first and second housings have a closed position and one or more opened positions. In the closed position, the circular and extending portions of the second housing are adjacent to the first housing. In one or more opened positions, the circular portion is adjacent to the first housing and at least a portion of the extending portion is positioned away from the first housing.

Figure 1:
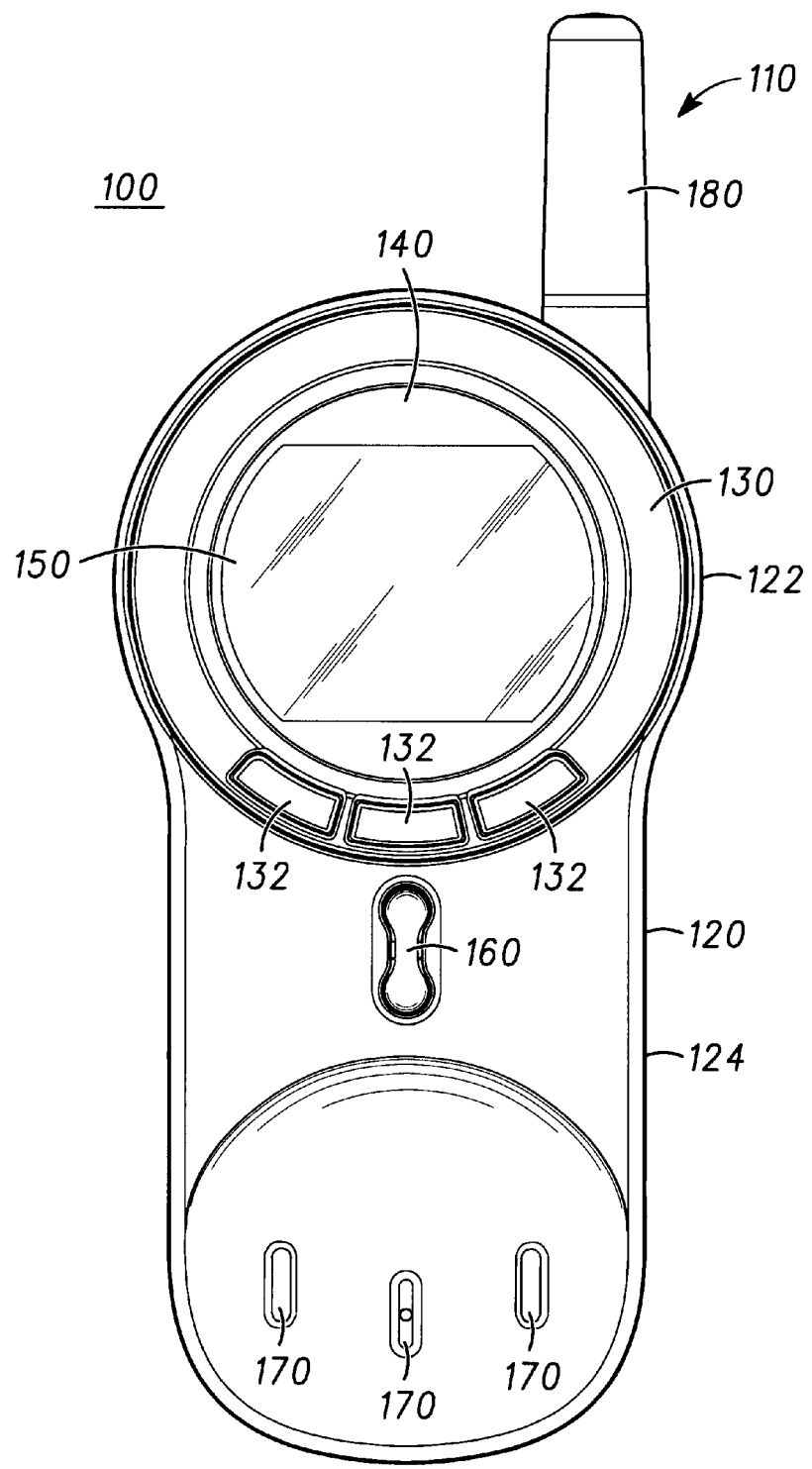
FIG. 1 is a perspective view of a radiotelephone in a closed position.

Referring to FIG. 1, there is provided a collapsible radiotelephone 100 in a closed position 110. The radiotelephone 100 has wireless communication capabilities and, thus, may be used to communicate with wireless infrastructure, such as cellular base stations, regional and local wireless transponders, and wireless local area networks. The radiotelephone 100 described herein is a representation of the type of wireless communication device that may benefit from the present invention. However, it is to be understood that the present invention may be applied to any type of portable electronic device and is not limited to the following devices: radiotelephones, cordless phones, paging devices, personal digital assistants, portable computers, pen-based or keyboard-based handheld devices, remote control units, an audio player (such as an MP3 player) and the like. Accordingly, any reference herein to the radiotelephone 100 should also be considered to apply equally to other portable electronic devices.

For the preferred embodiment shown in FIG. 1, the radiotelephone 100 includes an upper housing 120 having a generally elongated and planar shape. The upper housing 120 has an upper circular portion 122 at one end and an upper extending portion 124 extending away from the upper circular portion. For this closed position 110, the upper circular portion 122 and the upper extending portion 124 are adjacent to a lower housing (shown in FIG. 2). Also, an external antenna 180 may be provided to enhance the wireless communication capabilities of the radiotelephone 100.

Components of the radiotelephone 100 are positioned near the upper circular portion 122 including an interchangeable cover 130, a locking piece 140, and a display 150. The interchangeable cover 130 has a ring-like shape that may be attached to, and detached from, the radiotelephone 100. Since the interchangeable cover 130 may be easily attached and detached by a user without the need of tools, the user may select among interchangeable covers of different colors to decorate the radiotelephone 100. In addition, the interchangeable cover 130 may include cover selection buttons 132 and/or indicator lights (not shown) to provide additional functionality to the radiotelephone 100. For example, the preferred embodiment provides three cover selection keys 132: a left selection key, and right selection key and a menu key therebetween. The display 150 may be any type of output device that provides a convenient display of text and/or graphics to the user. Preferably, the display 150 is a liquid crystal display having a backlighting system to illuminate the display when lighting conditions are insufficient for proper viewing by the user. The locking piece 140 locks certain components of the radiotelephone 100 together, which is explained below. The locking piece 140 also functions as a display lens to protect the display 150 from undesirable, foreign matter.

The extended portion 124 of the upper housing 120 may include upper housing selection buttons 160 and speaker apertures 170. Although many different selection buttons may be provided on the upper housing 120, only one upper housing selection button 160 is shown in FIG. 1 by way of example. Thus, the upper housing 120 of the present invention may include one or more selection buttons (such as selection buttons 132 and 160) for various types of features including, but not limited to, volume control, menu control, call answering, call termination, caller identification, phone book control, voicemail control, e-mail/messaging control, network browsing, power on/off, and the like. The speaker apertures 170 direct sounds generated by an audio output device (shown in FIG. 5) to the user.

Figure 2:
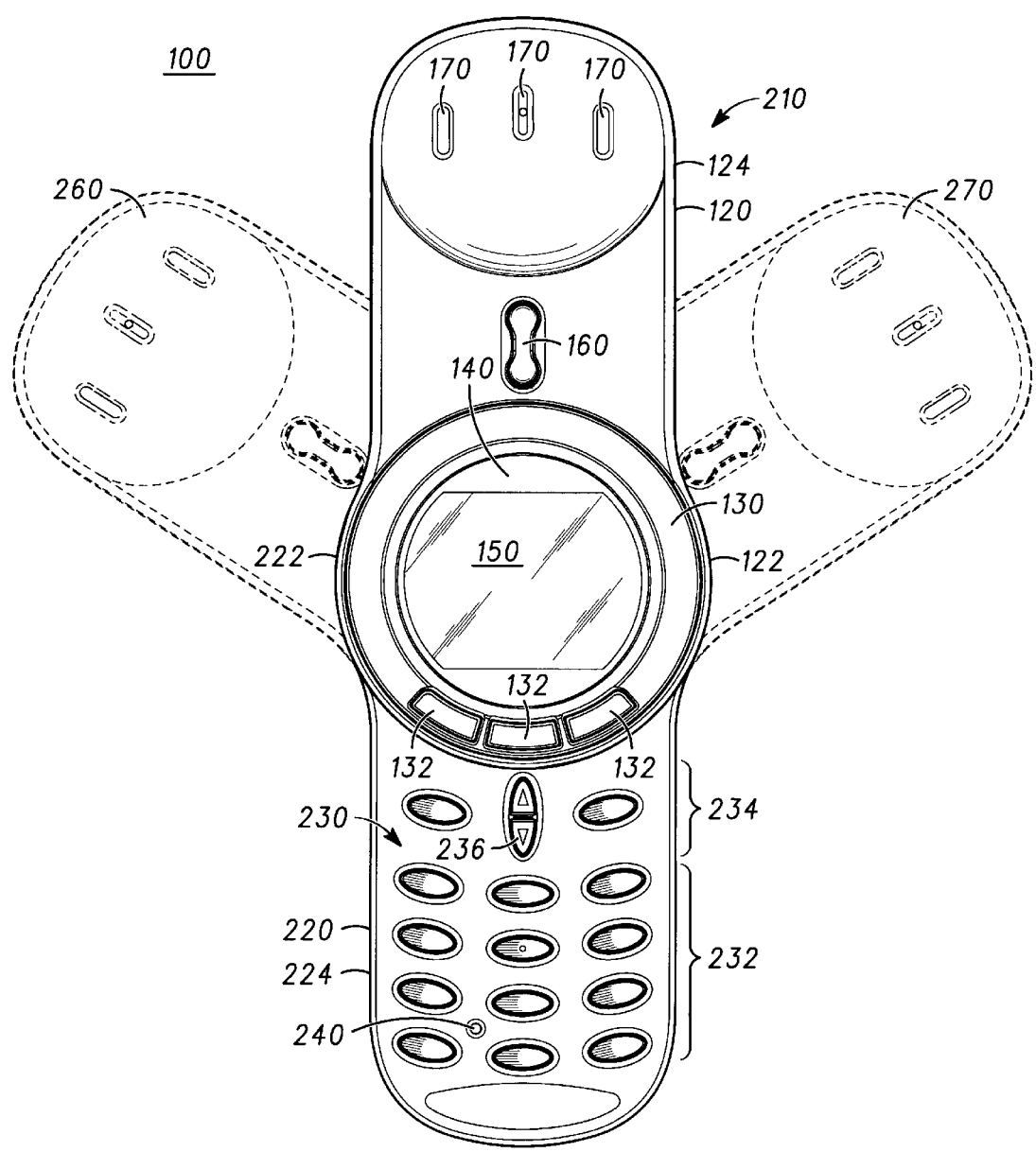
FIG. 2 is a perspective view of the radiotelephone of HG. 1 in an opened position as well as two alternative positions.

Referring to FIG. 2, the preferred embodiment of the radiotelephone 100 is shown in an opened position 210. The portions the radiotelephone 100 that become visible in the opened position 210 include a lower housing 220, a keypad 230 and a microphone aperture 240. When viewed from above, the lower housing of the preferred embodiment has a substantially similar profile to the upper housing 120. Similar to the upper housing 120, the lower housing includes a lower circular portion 222 and a lower extending portion 224. For this opened position 210, the upper circular portion 122 of the upper housing 120 is adjacent to, and positioned above, the lower circular portion of the lower housing 220. On the other hand, the upper extending portion 124 is positioned away from the lower housing. For example, as shown in FIG. 2, the upper extending portion 124 is positioned the opposite the lower extending portion 124 on opposite sides of the upper and lower circular portions 122 & 222. The keypad 230 may include any layout of keys that provide convenient operation of the radiotelephone 100 by the user. The microphone aperture 240 directs sounds received from the user or other local sounds to an audio input device (shown in FIG. 5).

The preferred embodiment includes a standard layout of alphanumeric and menu control for operation of the radiotelephone 100. As shown in FIG. 2, the keypad 230 includes twelve standard keys 232 (namely, 0 through 9, # and *) as well as three lower housing selection buttons 234. However, the radiotelephone 100 may include a larger grouping of keys, such as a QWERTY keyboard, if a device having a larger form factor or smaller individual keys is desired. Although not shown in FIG. 2, the keypad 230 may also include a cursor or graphical pointing device such as a joystick, touch pad or track ball. Also, similar to selection buttons 132 and 160 described, above, the lower housing selection buttons 234 may be used for various features including, but not limited to, volume control, menu control, call answering, call termination, caller identification, phone book control, voicemail control, e-mail/messaging control, network browsing, power on/off, and the like.

The position of the upper housing 120 is not restricted the opened position 210 and the closed position 110 described above. The upper extending portion 124 of the upper housing 120 has at least three functional positions about a housing support or bottom support (described below) of the lower housing 220. The preferred embodiment shown in FIG. 2 includes four functional positions, namely opened position 210, closed position 110, and auxiliary positions 260 & 270. Generally, the opened position 210 and the closed position 110 may activate functions of the radiotelephone 100 such as answering an incoming call and terminating an existing call. Each of the auxiliary positions 260 & 270 may also be set to activate a particular function of the radiotelephone 100. For example, auxiliary position 260 may operate to illuminate the display 150 (without answering an incoming call, if one exists), and auxiliary position 270 may operate to provide caller identification information about an incoming call that is not provided in the closed position 110.

Another function that may be activated by the functional positions of the upper extending portion 124 includes changing between different modes of operation for a multimode device. For example, the position of the upper extending portion 124 may determine whether the wireless communication device operates as a radiotelephone, a pager, a network browser, an e-mail device, a personal digital assistant, or an audio player.

Still another function that may be activated by the functional positions of the upper extending portion 124 includes scrolling through a predetermined selection of data shown on the display 150. For example, the upper extending portion 124 may be rotated to conveniently move up and down a list of contacts and/or phone numbers, or a listing of alphanumeric characters (i.e. "A" through "Z", "a" through "z", "0" through "9", and any special characters). This feature may also be used to operate functions that are not necessarily shown on the display 150, such as volume control.

Regardless of the position of the upper housing 120 relative to the lower housing 220, the cover selection buttons 132, upper housing selection button 160, and lower housing selection buttons 234 may operate independently or in cooperation. For example, the each of these selection buttons 132, 160 & 234 may activate a different function of the radiotelephone 100. Regarding the upper housing selection button 160, its function may change depending upon the position of the upper housing 120 relative to the lower housing 220. For the preferred embodiment, the upper housing selection button 160 and the middle button 236 of the lower housing selection buttons 234 operate cooperatively. In the closed position 110 shown in FIG. 1, the upper housing selection button 160 is a mechanical lever that physically contacts the surface of the middle button 236 when a user adjusts the upper housing selection button. In the opened position 210 (and the alternative positions 260 & 270), the upper housing selection button 160 does not have any function.

Figure 3:
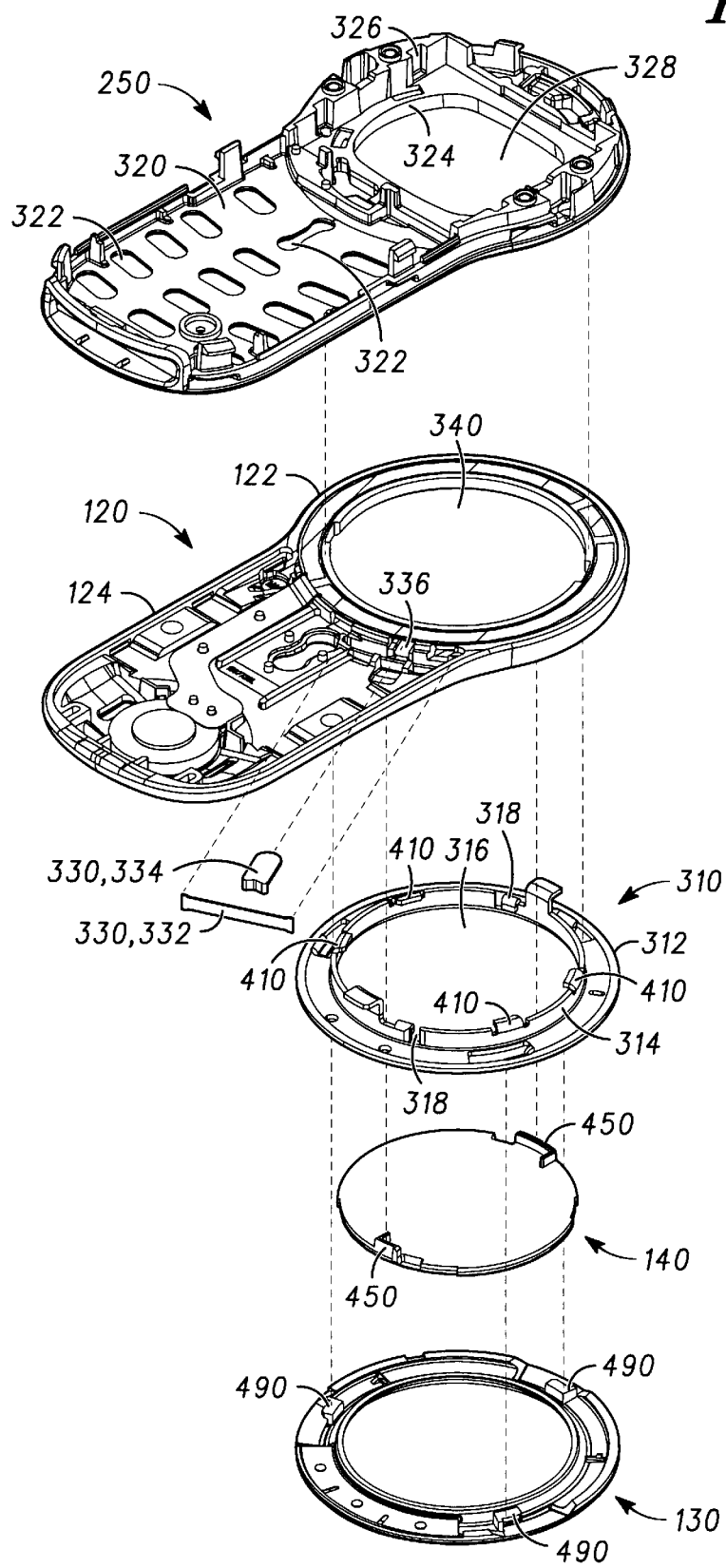
FIG. 3 is an exploded, perspective view of the radiotelephone of FIG. 1 viewed from the bottom down.

Referring to FIG. 3, the radiotelephone 100 of the preferred embodiment includes a top support 310 in addition to the lower housing 220, the upper housing 120, the locking piece 140 and the interchangeable cover 130 described above in reference to FIGS. 1 and 2. In contrast to FIGS. 1 & 2, certain sections of the radiotelephone 100, such as an inner surface of the upper housing 120, an outer surface of the lower housing 220, the display 150 and other components within the upper and lower housings, are not shown in FIG. 3 to more easily view the relationship among the top support 310, the lower housing, the upper housing, the locking piece 140 and the interchangeable cover 130. The lower housing 220 includes the lower circular portion 222 and the lower extending portion 224 (shown in FIG. 2). The lower circular portion 222 includes the housing support or bottom support 250 and the display 150 (shown in FIGS. 1 & 2).

The bottom support 250 includes a bottom support rim 324 having a circular shape and a bottom support base 326 to receive and support the display 150 (shown in FIGS. 1 & 2) such as a backlit liquid crystal display. The bottom support rim 324 defines a bottom support opening 328 to provide a viewing area of the display 150 to the user. The housing support or bottom support 250 may be an integrated component that is part of the lower housing 220 or a separable component that is positioned within the lower housing. As shown in FIG. 3, the bottom support 250 of the preferred embodiment is an integrated component that is part of an inside wall 320 of the lower housing 220. The bottom support 250 is integrated with one part of the lower housing 220 to retain the display 150 in that area of the lower housing. The other part of the lower housing 220 includes keypad apertures 322 to reveal user-accessible portions of the keypad 230.

The top support 310 mates with the bottom support 250 and maintains the upper housing 120 between the top and bottom supports. The top and bottom supports 310 & 250 are made of a rigid material, preferably a metallic material, to form a strong, inflexible coupling between the top and bottom supports. The top support 310 includes a top support base 312 and a top support rim 314 having a circular shape. The top support 310 is positioned over the upper housing 120 so that a lower surface of the top support base 312 is adjacent to an upper surface of the upper circular portion 122. Similarly, the bottom support 250 is positioned under the upper housing 120 so that an upper surface of the bottom support base 326 is adjacent to a lower surface of the upper circular portion 122. Also, the top support rim 314 is positioned around the bottom support rim 324 so that an inner surface of the top support rim is adjacent to an outer surface of the bottom support rim. The upper housing 120 is situated between the top support 310 and the bottom support 250 so that the inner surface of the upper circular portion 122 is adjacent to the outer surface of the top support rim 314. Accordingly, the upper circular portion 122 is capable of rotating about the top support rim 314 and the bottom support rim 324.

The top support rim 314 of the top support 310 defines a top support opening 316 to permit the user to see a viewing area of the display 150. The shape of the top support 310 may vary, but the top support rim 314 is preferably circular to provide a rotatable surface for the upper housing 120. Also, the top support opening 316 of the top support 310 preferably has a shape that does not obstruct the user's view of the display 150. Similarly, the upper housing 120 includes an upper housing opening 340 to permit the user to see a viewing area of the display 150 and, preferably, does not obstruct the user's view of the display.

As shown in FIG. 3, the locking piece 140 is positioned through the top support 310 and coupled to the bottom support 250 to prevent the top support from detaching from the bottom support. A more detailed explanation is provided below in reference to FIG. 4. Of course, as stated above, the locking piece 140 of the preferred embodiment also serves as the display lens to protect the display 150 from undesirable, foreign matter The upper housing 120 may also include a detent assembly 330 to position the upper housing at various positions about the top and bottom supports 310 & 250. More specifically, the detent assembly 330 permits the upper extending portion 124 of the upper housing 120 to be positioned at various positions about the top support rim 314 and the bottom support rim 324. For the preferred embodiment, the detent assembly 330 includes a spring 332 and a follower 334 that are supported by the upper circular portion 122. The follower 334 is positioned in an aperture 336 through a sidewall of the upper circular portion 122 so that it protrudes passed the inner surface of the upper circular portion. The spring 332 flexibly supports the follower 334 at this position, so that the follower may mate with a slot 318 provided on the outer surface of the top support rim 314. In the alternative, the detent assembly 330 may include a one-piece spring having a projecting form that provides the functions of the spring 332 and the follower 334 of the preferred embodiment.

As shown in FIG. 3, the top support 310 may have a plurality of slots 318 and, likewise, the upper housing 120 may have a plurality of detent assemblies 330. This structure permits the radiotelephone 100, particularly, the upper extending portion 124 of the upper housing 120, to have at least three positions about the bottom support rim 324 of the lower housing 220, as explained above in reference to FIG. 2.

Figure 4:
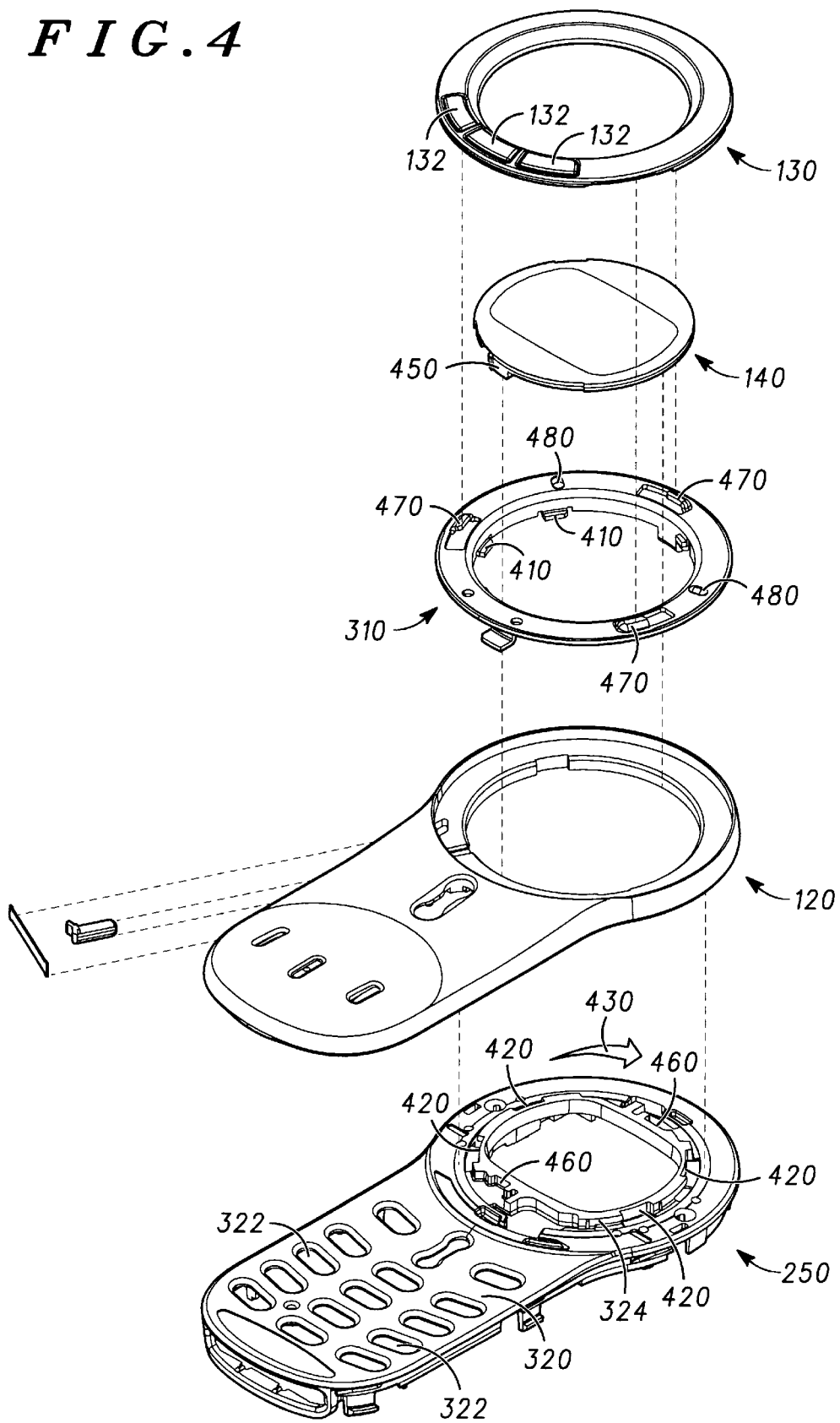
FIG. 4 is an exploded, perspective view of the radiotelephone of FIG. 1 viewed from the top down.

Referring to FIG. 4, the interlocking connection among the locking piece 140, the top support 310, and the bottom support 250 are represented. To assemble these components, the top support 310 is dropped onto the bottom support 250. The top support 310 includes one or more top support inner and outer anchors 410 & 412 (also shown in FIG. 3), and the bottom support 320 includes corresponding bottom support inner and outer grooves 420 & 422. Top support inner anchors 410 of the top support 310 are aligned with corresponding bottom support inner grooves 420 of the bottom support 250 and, similarly, top support outer anchors 412 of the top support are aligned with corresponding bottom support outer grooves 422 of the bottom support. Then, the top support 310 is rotated, as shown by direction 430, to lock the top support inner and outer anchors 410 & 412 into the bottom support inner & outer grooves 420 & 422. Finally, the locking piece 140 is dropped down to prevent the top support 310 from rotating back in a direction opposite the original direction 430. The locking piece 140 includes one or more locking piece feet 450 (also shown in FIG. 3) for mating with corresponding bottom support retaining areas 460 of the bottom support 250.

Referring again to FIG. 1 in conjunction with FIG. 4, the interchangeable cover 130 may be attached to, and detached from, the radiotelephone 100 by a user without the need for tools. The interchangeable cover 130 would have a ring-like shape that may enhance but, preferably, does not obstruct the user's view of the display 150. The interchangeable cover 130 includes cover anchors 490 that mate with corresponding top support grooves 470 of the top support 310. The top support 310 also includes projections 480 to provide tension against the inner surface of the interchangeable cover 130 in order to retain the cover anchors 490 in the top support grooves 470.

Although not shown in FIG. 4, the cover selection buttons 132 of the preferred embodiment has electrical contacts that couple to corresponding electrical contacts of the top support 310. These corresponding electrical contacts of the top support 310 are coupled to electronic components, discussed below in reference to FIG. 5, supported in the lower housing 250 by a flex cable.

Figure 5:
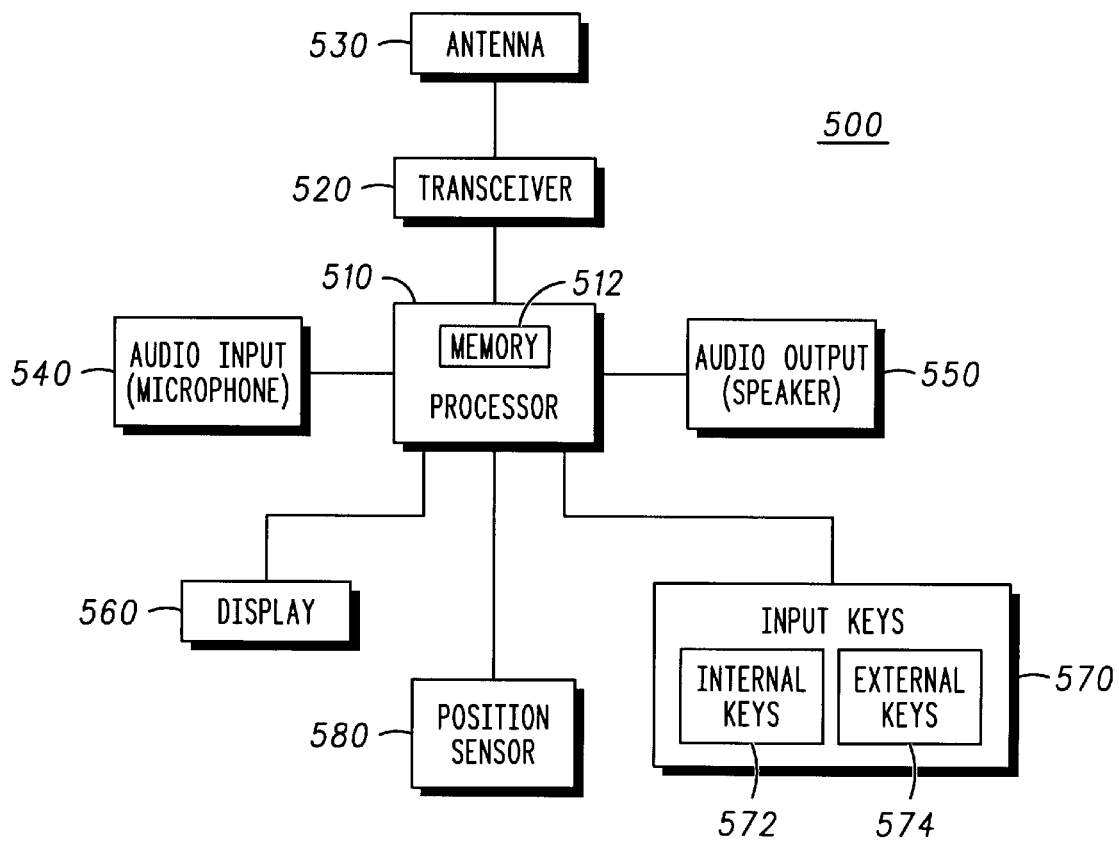
FIG. 5 is a block diagram of the internal, electronic components of the radiotelephone of FIG. 1.

Referring to FIG. 5, the electronic components 500 of the radiotelephone 100 are housed within the upper and lower housings 120 & 220. The electronic components 500 include a processor 510, a transceiver 520 and an antenna 530. For the preferred embodiment, the antenna 530 transmits radio frequency ("RF") signals received from the transceiver 520 and provides RF signals to the transceiver that it receives. Likewise, the transceiver 520 converts controls signals received from the processor 510 for transmission by the antenna 530, and converts RF signal received by the antenna for processing by the processor. The processor 510 acts as a central processing unit for the radiotelephone 100 and coordinates the operations of the electronic components 500. The processor 510 also includes a memory portion 512 to store and retrieve data as well as perform various operations of the radiotelephone 100. However, it is to be understood that various functions described herein for the electronic components 500 may be integrated or segregated and, thus, the present invention is not limited to particular discrete components shown in FIG. 5. For example, the processor 510 and the transceiver 520 may be combined in a single integrated circuit, or the processor and the memory portion 512 may be separated to different components.

The electronic components 500 may also include an audio input 540, an audio output 550, a display 560 and input keys 570. For the preferred embodiment, the audio input 540 is a microphone that receives sounds through the microphone aperture 240 (shown in FIG. 2) and the audio output 550 is an earpiece that emits sounds through the speaker apertures 170 (shown in FIGS. 1 & 2). Also, for the preferred embodiment, the display 560 is a backlit, liquid crystal display that is shown in FIGS. 1 & 2 as display 150. The input keys 570 include internal keys 572 such as the keypad 230 (shown in FIG. 2) and external keys 574 such as the upper housing selection button 160 and the cover selection buttons 132 (shown in FIGS. 1 & 2). The display 560 and the input keys 570 may also include connections to any indicator lights or selection buttons provided on the interchangeable cover 140, as described above.

The electronic components 500 of the present invention further include at least one position sensor 580. For example, the position sensor 580 of the preferred embodiment is a Hall effect detector that includes a magnet mounted on the upper circular portion 122 of the upper housing 120 and a Hall effect switch mounted to the lower circular portion 222 of the lower housing 220. A single position sensor 580 is capable of detecting a particular position of the upper housing 120 relative to the lower housing 220. Therefore, a plurality of position sensors 580 may be positioned throughout the circular portions 122 & 222 of the upper and lower housings 120 & 220 to detect various positions of the upper housing relative to the lower housing, such as the closed position 110, an opened position 210, and additional positions (such as 260 & 270) about the housing support 250. The position sensor 580 is capable of determining a particular position of the upper housing 120 relative to the lower housing 220 and generating a response signal corresponding to the particular position. The processor 510 is then effective to activate a particular function of the radiotelephone 100 in response to the response signal when the upper housing 120 is positioned at one of the additional positions.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device comprising:
    a first housing including a housing support capable of retaining a display; and
    a second housing movably coupled to the first housing, the second housing being capable of rotating about at least a portion of the housing support,
    wherein each of the first and second housings includes an opening therethrough, and the display may be viewed through the openings of the first and second housing.

2. The wireless communication device of claim 1, wherein:
    the first housing includes a first circular portion and a first extending portion, the first circular portion including the housing support and the display; and
    the second housing includes a second circular portion and a second extending portion, the second circular portion being capable of rotating about the at least a portion of the housing support.

3. The wireless communication device of claim 1, wherein:
    the housing support is a first housing support;
    a second housing support is coupled to the first housing support; and
    the second housing is capable of rotating between at least a portion of the first and second housing supports.

4. The wireless communication device of claim 3, wherein each of the first and second housing supports includes an opening therethrough, and the display may be viewed through the openings of the first and second housing supports.

5. The wireless communication device of claim 3, further comprising a locking piece to maintain the second housing support against the first housing support.

6. The wireless communication device of claim 3, further comprising an interchangeable cover attachable to the second housing support, the interchangeable cover being positioned about a viewing area of the second housing support.

7. The wireless communication device of claim 3, wherein each of the first and second housing supports is made of a rigid material to form a strong, inflexible coupling therebetween.

8. The wireless communication device of claim 1, wherein the second housing is capable of rotating 360 degrees about the at least a portion of the housing support.

9. The wireless communication device of claim 1, wherein:
    the first housing includes a processor, a wireless transceiver and an audio input device, the wireless transceiver and the audio input device being coupled to the processor; and
    the second housing includes an audio output device coupled to the processor.

10. The wireless communication device of claim 1, wherein further comprising a position sensor capable of determining a particular position of the second housing relative to the first housing.

11. A wireless communication device comprising:

a first housing including a housing support capable of retaining a display; and a second housing having a circular portion positioned about at least a portion of the housing support and an extending portion extending away from the circular portion, the circular portion being capable of rotating about the at least a portion of the housing support, wherein the first and second housings have a closed position and an opened position, the circular and extending portions of the second housing being adjacent to the first housing for the closed position, and the circular portion being adjacent to the first housing and the extending portion being away from the first housing for the opened position, and wherein each of the first and second housings includes an opening therethrough, and the display may be viewed through the openings of the first and second housings.

12. The wireless communication device of claim 11, wherein:

the first housing includes a first circular portion and a first extending portion, the first circular portion including the housing support and the display; and the second housing includes a second circular portion and a second extending portion, the second circular portion being capable of rotating about the at least a portion of the housing support.

13. The wireless communication device of claim 11, wherein:

the housing support is a first housing support;

a second housing support is coupled to the first housing support; and the second housing is capable of rotating between at least a portion of the first and second housing supports.

14. The wireless communication device of claim 13, wherein each of the first and second housing supports includes an opening therethrough, and the display may be viewed through the openings of the first and second housing supports.

15. The wireless communication device of claim 11, further comprising an interchangeable cover attachable to the second housing support, the interchangeable cover being positioned about a viewing area of the second housing support.

16. The wireless communication device of claim 11, wherein:

the first housing includes a processor, a wireless transceiver and an audio input device, the wireless transceiver and the audio input device being coupled to the processor; and the second housing includes an audio output device coupled to the processor.

17. The wireless communication device of claim 11, further comprising a position sensor capable of determining a particular position of the second housing relative to the first housing.

18. A wireless communication device comprising:

a first housing including a housing support; and a second housing being capable of rotating around the housing support, wherein the second housing has a closed position, an opened position, and at least one additional position about the housing support of the first housing, the at least one additional position being effective to activate a particular function of the device, and wherein each of the first and second housings includes an opening therethrough, and the display may be viewed through the openings of the first and second housings.

19. The wireless communication device of claim 18, wherein:

the first housing includes a first circular portion and a first extending portion, the first circular portion including the housing support; and the second housing includes a second circular portion positioned about the housing support and a second extending portion extending away from the second circular portion, the second circular portion being capable of rotating about the at least a portion of the housing support.

20. The wireless communication device of claim 18, wherein:

the housing support is a first housing support;

a second housing support is coupled to the first housing support; and the second housing is capable of rotating between at least a portion of the first and second housing supports.

21. The wireless communication device of claim 20, wherein each of the first and second housing supports includes an opening therethrough, and the display may be viewed through the openings of the first and second housing supports.

22. The wireless communication device of claim 18, further comprising an interchangeable cover attachable to the second housing support, the interchangeable cover being positioned about a viewing area of the second housing support.

23. The wireless communication device of claim 18, wherein:

the first housing includes a processor, a wireless transceiver and an audio input device, the wireless transceiver and the audio input device being coupled to the processor; and the second housing includes an audio output device coupled to the processor.

24. The wireless communication device of claim 18, further comprising a processor and a position sensor coupled to the processor, the position sensor being capable of determining a particular position of the second housing relative to the first housing and generating a response signal corresponding to the particular position, the processor being effective to activate a particular function of the device in response to the response signal when the second housing is positioned at the at least one additional position.

25. A wireless communication device comprising:

a first housing including a housing support;

a second housing being capable of rotating around the housing support; the second housing having a closed position, an opened position, and at least one additional position about the housing support of the first housing, the at least one additional position being effective to activate a particular function of the device; and a detent assembly to position the second housing at the closed position, the opened position and the at least one additional position about the housing support, the detent assembly being supported by the second housing and capable of contacting slots provided on the housing support.

* * * * *

UNITED STATES PATENT AND TRADEMARK OFFICE
CERTIFICATE OF CORRECTION

PATENT NO.    : 6,768,899 B2
DATED         : July 27, 2004
INVENTOR(S)   : Janninck, Mark et al.

It is certified that error appears in the above-identified patent and that said Letters Patent is hereby corrected as shown below:

<u>Column 8,</u>
Line 19, add -- for any rotatable position of the second housing relative to the first housing --.

<u>Column 9,</u>
Line 18, add -- for any rotatable position of the second housing relative to the first housing --.

<u>Column 10,</u>
Line 4, add -- at each position --.

Signed and Sealed this

Nineteenth Day of October, 2004

JON W. DUDAS
*Director of the United States Patent and Trademark Office*